(12) United States Patent
Saito et al.

(10) Patent No.: US 6,869,657 B2
(45) Date of Patent: Mar. 22, 2005

(54) GASKET MATERIAL

(75) Inventors: Hiroshi Saito, Nara (JP); Kenichiro Ishikawa, Nara (JP)

(73) Assignee: Nichias Corporation, Tokyo (JP)

( * ) Notice: Subject to any disclaimer, the term of this patent is extended or adjusted under 35 U.S.C. 154(b) by 368 days.

(21) Appl. No.: 10/259,421

(22) Filed: Sep. 30, 2002

(65) Prior Publication Data

US 2003/0090068 A1 May 15, 2003

(30) Foreign Application Priority Data

Sep. 28, 2001 (JP) ........................................ 2001-302342

(51) Int. Cl.⁷ .............................................. B32B 25/00
(52) U.S. Cl. ...................... 428/66.6; 428/460; 428/472; 428/494; 277/654; 277/936; 277/939
(58) Field of Search ................................. 428/460, 494, 428/472, 66.6; 277/654, 939, 936

(56) References Cited

U.S. PATENT DOCUMENTS 5,110,630 A    5/1992    Abe et al.

FOREIGN PATENT DOCUMENTS

| EP | 0 320 826 A | 6/1989 |
|---|---|---|
| JP | 03227622 | 10/1991 |
| JP | 03265764 | 11/1991 |

Primary Examiner—Alexander S. Thomas
(74) Attorney, Agent, or Firm—Nixon & Vanderhye P.C.

(57) ABSTRACT

A material for a gasket used in a vehicular engine comprising a steel plate, a coating film which is formed on one or both sides of said steel plate, and a rubber layer formed on said coating film, wherein the coating film comprises an acid, water-dispersible silica, a titanium compound, and a water-soluble polymer represented by a specific formula.

1 Claim, No Drawings

GASKET MATERIAL

FIELD OF THE INVENTION

This invention relates to a material for a gasket used in a vehicular engine, particularly a gasket material with improved resistance to antifreeze.

BACKGROUND OF THE INVENTION

Rubber-coated stainless steel is generally distributed as a gasket material for vehicular engines. For example, JP-A-3-227622 discloses a gasket material composed of a stainless steel plate having on one or both sides thereof a chromate film comprising a chromium compound, phosphoric acid and silica and a rubber layer applied on the chromate film.

Such a gasket material having a rubber layer on a chromate-treated stainless steel plate exhibits improved performance such as heat resistance and adhesion in antifreeze. However, the recent enhanced consciousness of environmental conservation has been boosting the tendency to avoid chromate treatment because hexavalent chromium contained in a chromate treating liquid directly gives adverse influences to human body. Besides, waste liquid containing hexavalent chromium must be subjected to special treatment as regulated in Water Pollution Control Law (Japan), and scrap of chromate-treated stainless steel is not recyclable. Additionally, there is high possibility that chromium is extracted from the chromate film in contact with antifreeze or oil.

SUMMARY OF THE INVENTION

Hence the chromate-treated gasket material gives rise to great environmental issues. Accordingly, it is an object of the present invention to provide a gasket material which is environmentally friendly and yet equal or superior to the chromate-treated gasket material in heat resistance and adhesion and additionally has resistance to antifreeze.

In the light of the above-mentioned problems of conventional gasket materials, the present inventors have conducted extensive studies on a chromium-free surface treating film. As a result, they have found that the object is accomplished by forming a coating film comprising an acid, water-dispersible silica, a titanium compound, and a specific water-soluble polymer on a steel plate.

The present invention provides a gasket material comprising a steel plate, a coating film comprising an acid, water-dispersible silica, a titanium compound, and a water-soluble polymer represented by formula (I) shown below formed on one or both sides of the steel plate, and a rubber layer formed on the coating film.

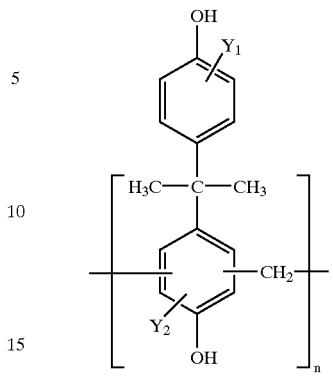

wherein n is an integer of 2 to 50; and $Y_1$ and $Y_2$, which may be the same or different, each represent a hydrogen atom or a group Z represented by formula (a) or (b):

wherein R1, R2, R3, R4, and R5, which may be the same or different, each represent a hydrogen atom, an alkyl group having 1 to 10 carbon atoms or a hydroxyalkyl group having 1 to 10 carbon atoms; and the average number of the Z group per each benzene ring of the water-soluble polymer is respectively from 0.2 to 1.0.

DETAILED DESCRIPTION OF THE INVENTION

The coating film formed on a steel plate comprises (A) an acid, (B) water-dispersible silica, (C) a titanium compound, and (D) a water-soluble polymer represented by formula (I).

The acid which can be used as component (A) includes inorganic acids such as phosphoric acids (including orthophoshoric acid, condensed phosphoric acids, and phosphoric anhydride), sulfuric acid, hydrofluoric acid, and the like, and organic acids such as acetic acid and the like. The acid is preferably used in an amount of 10 to 50% by weight, preferably 25 to 35% by weight, based on the coating film.

The water-dispersible silica which can be used as component (B) includes colloidal silica and gas phase silica. Colloidal silica to be used in the invention is not particularly limited. Examples thereof include, Snowtex series available from Nissan Chemical Industries, Ltd. (e.g., Snowtex C, O, N, S, UP, PS-M, PS-L, 20, 30, and 40). Gas phase silica to be used in the invention is not particularly limited. Examples thereof include, Aerosil series available from Nippon Aerosil Co., Ltd. (e.g., Aerosil 50, 130, 200, 300, 380, TT600, MOX80, and MOX170). The water-dispersible silica is preferably used in an amount of 5 to 15% by weight, more preferably 8 to 12% by weight, based on the coating film.

The titanium compound which can be used as component (C) includes water-soluble inorganic titanium compounds, such as titanium sulfate, titanium oxysulfate, titanium hydrofluoride, and ammonium titanium fluoride; organic titanium salts, such as potassium titanium oxalate and titanium citrate; and titanium alkoxides. The titanium compound is preferably used in an amount of 0.0010 mol or more per 100 g of the coating film. When the amount thereof is less than 0.0010 mol, the effect of addition is not manifested, and resistance to antifreeze will be insufficient.

The water-soluble polymer which can be used as component (D) is an oligomer or polymer represented by formula (I):

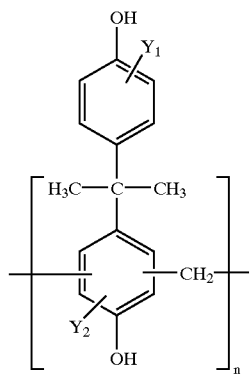

(I)

wherein n, an average degree of polymerization of the unit, is from 2 to 50; and $Y_1$, and $Y_2$, which may be the same or different, each represent a hydrogen atom or a group Z represented by formula (a) or (b):

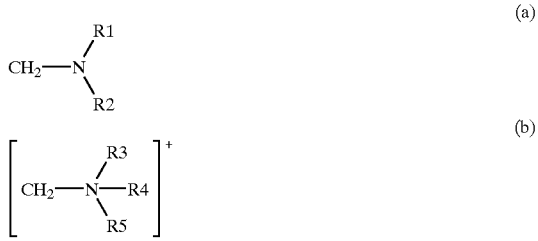

wherein R1, R2, R3, R4, and R5, which may be the same or different, each represent a hydrogen atom, an alkyl group having 1 to 10 carbon atoms or a hydroxyalkyl group having 1 to 10 carbon atoms.

n is preferably from 10 to 40.

In the alkyl group and the hydroxyalkyl group, if the number of carbon atom is 11 or more, a performance such as adhesion, heat resistance, and antifreeze resistance may become insufficient because forming properties of a coating film are reduced.

The average number of the Z group per each benzene ring of the water-soluble polymer is respectively from 0.2 to 1.0.

When the average number of the substitution group Z is smaller than 0.2, the resulting coating film may have insufficient adhesion to a steel plate. When it exceeds 1.0, the resulting coating film may exhibit so much hydrophilicity that the resulting gasket material will have insufficient resistance to antifreeze.

The steel used in the present invention as a substrate is not particularly limited. Examples thereof include stainless steel (e.g., ferrite type, martensite type and austenite type), iron, and aluminum.

The coating composition comprising components (A) to (D) in a prescribed mixing ratio is applied on one or both sides of a steel plate by known means, such as a roll coater, and dried at about 150° C. to form a coating film. The coating weight is not particularly limited but the range thereof is practically from about 50 to 500 mg/m$^2$, preferably from 200 to 500 mg/m$^2$.

A rubber layer is then formed on the coating film to complete the gasket material of the invention. While any known rubber materials can be used to form the rubber layer, those excellent in heat resistance, chemical resistance and mechanical characteristics, such as fluororubber, silicone rubber, acrylonitrile-butadiene rubber (NBR), hydrogenated NBR (HNBR), and ethylene-propylene-diene rubber (EPDM), are suitable. The rubber layer can be formed by applying a solution of a rubber material in an appropriate solvent or a rubber latex to a thickness of 20 to 130 μm by means of a skim coater, a roller coater, etc. and vulcanizing the coating layer at 150 to 250° C.

The rubber layer may be applied directly on the coating film or via a primer, such as an adhesive comprising a nitrile rubber compound and a phenolic resin.

The present invention will now be illustrated in greater detail with reference to Examples and Comparative Examples for illustrative purposes only but not for limitation.

Preparation of Samples:

A coating composition having the formulation shown in Table 1 below was applied with a roll coater on both sides of a stainless steel plate and dried at 150° C. to form a coating film. The coating weight is shown in Table 2 below. Then, an adhesive comprising a nitrile rubber compound and a phenolic resin was applied on the coating film, followed by heat treatment to form a primer layer on the coating film. Samples having no primer layer were also prepared. A solution of nitrile rubber in a solvent was applied on the coating film or the primer layer with a roll coater and vulcanized at 180° C. for 10 minutes to form a rubber layer.

Method of Evaluation:

1) Antifreeze Resistance

A sample was vertically immersed to half its length (half-immersed) in automotive radiator coolant (Genuine Toyota Long Life Coolant) and kept for 500 hours at 120° C. The sample taken out of the coolant was subjected to a drawing test on both the immersed part and the non-immersed part. Separately, a whole sample was immersed (full-immersed) in the coolant and kept for 500 hours at 120° C. and then subjected to a cross-cut tape test. The testing methods and criteria of evaluation are as follows. The results obtained are shown in Table 2.

1-1) Drawing Test

A helical line was drawn on the sample to make 25 turns at a radius of 4.5 mm with a drawing tester specified in JIS K6894, and the state of the scratched rubber layer was observed and rated on a five-point scale.

The results, which were obtained, are indicated in the parts of non-immersed area and immersed area in Table 2 individually.

5 . . . The rubber layer remained completely.
4 . . . The rubber layer came off in parts.
3 . . . The rubber layer came off in about a half the scratched area.
2 . . . The rubber layer slightly remained.
1 . . . The rubber layer came off completely.

1-2) Cross-cut Tape Test

The following procedure according to JIS K5400 was followed.

i) The surface of a sample was cross-cut to make a grid of 100 squares of 2 mm side.
ii) An adhesive tape was put on the grid and rubbed with an eraser to completely adhere the adhesive tape to the sample.

iii) One or two minutes later, the free end of the adhesive tape was rapidly pulled in a direction perpendicular to the sample surface.

whereas the samples of Comparative Examples 1 to 3 having a coating film out of the scope of the present invention are seriously inferior.

TABLE 1

| Film No. | (A) | (B) | (C) | (D) n | $Y_1$ | $Y_2$ | Avg. Number of Z | Composition (wt %) (A) | (B) | (C) | (D) |
|---|---|---|---|---|---|---|---|---|---|---|---|
| 1 | phosphoric acid | Aerosil 200 | ammonium titanium fluoride | 5 | —$CH_2N(CH_3)_2$ | H | 0.5 | 10 | 20 | 1 | 69.0 |
| 2 | phosphoric acid | Aerosil 200 | titanium hydrofluoride | 5 | —$CH_2N(CH_3)_2$ | H | 0.5 | 20 | 10 | 0.5 | 69.5 |
| 3 | phosphoric acid | Aerosil 300 | ammonium titanium fluoride | 5 | —$CH_2N(CH_3)_2$ | —$CH_2N(CH_3)_2$ | 1.0 | 20 | 10 | 0.5 | 69.5 |
| 4 | phosphoric acid | Aerosil 380 | titanium hydrofluoride | 10 | —$CH_2N(CH_3)_2$ | H | 0.5 | 10 | 30 | 0.5 | 59.5 |
| 5 | phosphoric acid | Aerosil 50 | titanium hydrofluoride | 5 | —$CH_2N(CH_3)_2$ | H | 0.5 | 10 | 10 | 1 | 79.0 |
| 6 | none | Aerosil 200 | titanium hydrofluoride | None | | | | 0 | 99 | 1 | 0 |
| 7 | phosphoric acid | Aerosil 50 | titanium hydrofluoride | 100 | —$CH_2N(CH_3)_2$ | H | 0.5 | 10 | 20 | 1 | 69.0 |
| 8 | phosphoric acid | none | none | 5 | —$CH_2N(CH_3)_2$ | H | 0.5 | 10 | 0 | 0 | 90.0 |
| 9 | silica-chromium-phosphoric acid mixed film (chromate-treated) | | | | | | | | | | |

TABLE 2

| | Stainless Steel Plate | Coating Film No. (see Table 1) | Coating Weight (mg/m²) | Primer Layer | Cross-cut Test after Full Immersion | Resistance to Antifreeze Drawing Test after Half-immersion Non-immersed Area | Immersed Area | Heat Resistance (Cross-cut Test after Heating) |
|---|---|---|---|---|---|---|---|---|
| Example 1 | SUS304 | 1 | 300 | yes | 100/100 | 5 | 5 | 100/100 |
| Example 2 | SUS304 | 2 | 300 | yes | 100/100 | 5 | 5 | 100/100 |
| Example 3 | SUS301 | 3 | 200 | yes | 100/100 | 5 | 5 | 100/100 |
| Example 4 | SUS301 | 4 | 200 | yes | 100/100 | 5 | 5 | 100/100 |
| Example 5 | SUS316 | 5 | 500 | no | 100/100 | 5 | 5 | 100/100 |
| Compara. Example 1 | SUS304 | 6 | 200 | yes | 0/100 | 1 | 1 | 0/100 |
| Compara. Example 2 | SUS304 | 7 | 200 | yes | 10/100 | 1 | 1 | 100/100 |
| Compara. Example 3 | SUS301 | 8 | 300 | no | 0/100 | 2 | 2 | 50/100 |
| Compara. Example 4 | SUS301 | 9 | Cr: 30 | yes | 100/100 | 5 | 5 | 100/100 | iv) The number of squares remaining on the sample surface was counted.

The results are described in the part of cross-cut test after full immersion in Table 2.

2) Heat Resistant Adhesion (Heat Resistance)

A sample was heated at 200° C. for 500 hours and then subjected to the same cross-cut tape test as described above. The results were described in the part of heat resistance in Table 2.

As is apparent from Table 2, the samples of Examples 1 to 5 which had a coating film consisting of (A) the acid (phosphoric acid), (B) the water-dispersible silica, (C) the titanium compound, and (D) the water-soluble polymer are proved equal in performance as a gasket material to the chromate-treated stainless steel (Comparative Example 4), The gasket material according to the present invention exhibits excellent resistance to antifreeze, high heat resistance, and high adhesion without chromate treatment which is harmful to human body. It not only provides a very effective countermeasure for the social issues such as environmental conservation and recyclability but produces great effects in practical use.

While the invention has been described in detail and with reference to specific embodiments thereof, it will be apparent to one skilled in the art that various changes and modifications can be made therein without departing from the scope thereof.

This application is based on Japanese patent application No. 2001-302342 filed Sep. 28, 2001, the entire contents thereof being hereby incorporated by reference.

What is claimed is:

1. A material for a gasket used in a vehicular engine comprising a steel plate, a coating film which is formed on one or both sides of said steel plate, and a rubber layer formed on said coating film, wherein the coating film comprises an acid, water-dispersible silica, a titanium compound, and a water-soluble polymer represented by formula (I):

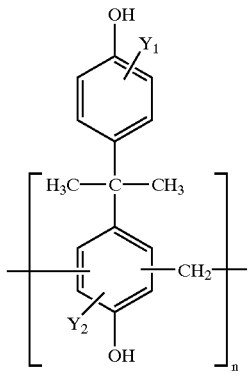

(I)

wherein n is an integer of 2 to 50; and $Y_1$, and $Y_2$, which may be the same or different, each represent a hydrogen atom or a group Z represented by formula (a) or (b):

(a)

(b)

wherein R1, R2, R3, R4, and R5, which may be the same or different, each represent a hydrogen atom, an alkyl group having 1 to 10 carbon atoms or a hydroxyalkyl group having 1 to 10 carbon atoms; and the average number of the Z group per each benzene ring of the water-soluble polymer is respectively from 0.2 to 1.0.

* * * * *